Patented May 23, 1939

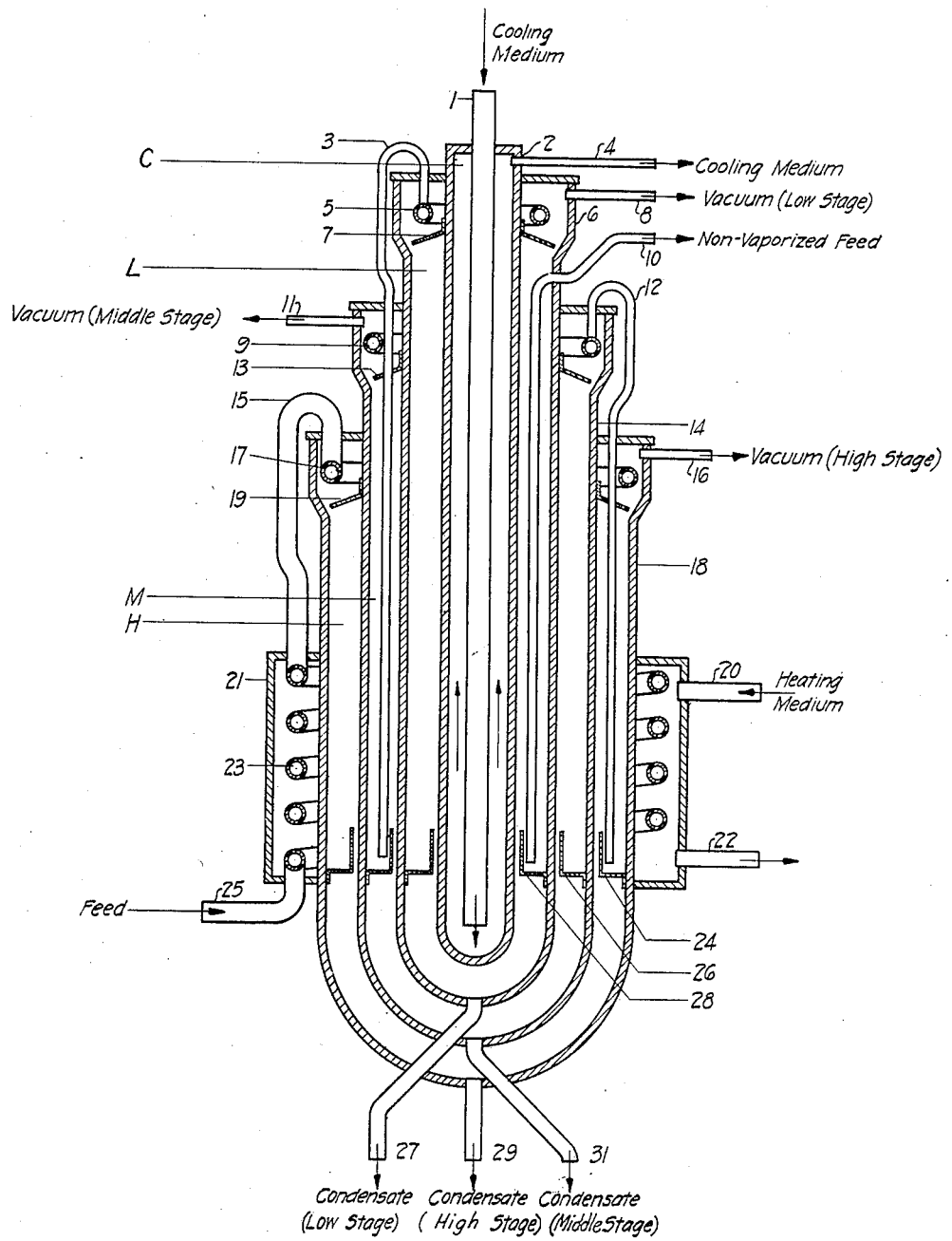

2,159,303

UNITED STATES PATENT OFFICE 2,159,303

MULTISTAGE EVAPORATOR

Hein Israel Waterman and Cornelus van Vlodrop, Delft, Netherlands, assignors to Shell Development Company, San Francisco, Calif., a corporation of Delaware Application February 26, 1937, Serial No. 127,872
In the Netherlands March 5, 1936

2 Claims. (Cl. 159—17)

This invention pertains to methods of distillation or evaporation of liquids of mineral, animal or vegetable origin, such as mineral oils, salts solutions, sugar sap, cod liver oil, etc., and relates more particularly to an apparatus whereby such liquids may be distilled, fractionated or concentrated in a plurality of stages.

According to this invention, the present apparatus comprises a series of chambers or stages separated from each other by a series of substantially vertical partitions. Heat is supplied to the first of said chambers and withdrawn from the last one, a step-wise temperature gradient being thereby maintained in the system. Suitable vacuum pumping means may be provided to maintain the chambers at pressures likewise decreasing in a step-wise manner from the first to the last chamber of the series. The liquid to be evaporated is supplied to the first chamber and conveyed consecutively through every chamber of the series to the last chamber. In each chamber the liquid is caused to flow over one face of each partition dividing adjacent chambers, said partitions being constructed so that the area over which the liquid is caused to flow becomes smaller with each successive partition starting from the first one.

Owing to this arrangement, and to the temperature and pressure which decrease in the system in the direction of the liquid flow from stage to stage, each of the intermediate partitions dividing the stages forms two working surfaces: an evaporating surface, over which the liquid flows, and a condensing surface, the latent heat of condensation liberated upon condensation of the vapors in a stage being used again to evaporate a further portion of the liquid in the next stage, operated at a lower pressure.

In a preferred embodiment of the present invention, the multi-stage evaporator comprises a series of annular chambers or stages, located concentrically about a substantially vertical axis.

Although various types of concentric multistage evaporators are already known to the art, these evaporators are subject to serious defects.

Thus, attempts have been made to feed the liquid to be evaporated to the central stage, passing it subsequently through the various stages towards the periphery of the apparatus. Since, however, the surface area of the concentric walls separating the stages increases away from the center, while the amount of the liquid conveyed from stage to stage decreases in the same direction due to evaporation and/or withdrawal of a portion of the liquid from each stage, an adequate film of liquid can be maintained on the walls of the outermost stages in such evaporators only at the price of an excessive thickness of the film on the walls of the inner stages, which renders the evaporation process inefficient.

In some other systems, the liquid feed is supplied to the outermost stage at a relatively low temperature and is subsequently passed towards the center where the temperature is higher, the pressure gradient being made to vary inversely as the temperature gradient. This also results in a decreased efficiency of the process, since the high pressure stages do not receive an amount of heat necessary for an effective vaporization of the liquid under the conditions of relatively high pressure prevailing therein.

The present system avoids these defects by providing a concentric multi-stage evaporator wherein the liquid to be evaporated is first fed to the outermost stage and then passed in a stepwise process to the inner stages. The quantity of the liquid flowing on the walls separating the stages decreases with every stage due to evaporation and/or withdrawal of desired fractions from the various stages, but is at all times sufficient to form a film of adequate thickness on the walls of all stages, since the surface area of the latter also decreases as the center is approached. The temperature, decreasing towards the center of the system, permits an efficient vaporization of the liquid in all stages because of a correspondingly decreasing pressure.

Other features and advantages of the invention will appear more clearly from the following description taken in connection with the attached drawing, giving a diagrammatic sectional elevation view of a preferred embodiment of said invention.

The drawing shows, by way of example, a three-stage evaporator, wherein three concentric cylindrical chambers are formed between substantially vertical concentric walls 2, 6, 14 and 18. These chambers are effectively sealed against outside pressures and if desirable may be connected by means of pipes 8, 11, and 16 to suitable vacuum pumping apparatus, adapted to maintain said chambers at any desired degree of vacuum. The outermost chamber H, formed between walls 18 and 14, is maintained at a higher pressure, or lower degree of vacuum, than the middle chamber M, formed between the walls 14 and 6, while the latter is at a higher pressure than the central chamber L, formed between walls 6 and 2.

A pipe 1 extends into the enclosed cylindrical space C formed by wall 2 inside the low pressure chamber L, and serves to circulate a cooling medium, such as water, which issues from the bottom of pipe 1, rises to the top of space C, and is withdrawn from the apparatus by means of pipe 4, the inside wall 2 of the low pressure chamber L being cooled by said medium.

The outermost chamber H is surrounded by a suitably heat-insulated jacket 21, within which a heating medium such as steam is circulated by means of pipes 20 and 22, heat being thereby supplied to the outside wall 18 of said chamber H.

In some cases, external means of heating, such as jacket 21, may be dispensed with, and a heated feed introduced into the chamber H, the heat content of the feed being adjusted at a sufficiently high value to keep the chamber H at the desired temperature.

A pipe 25 is provided to supply the feed to the system. Pipe 25 may be wound around the evaporator within or around the steam jacket 21, forming thereby a heat exchanger for preheating the feed. After passing through the heat exchanger, the feed is introduced into the chamber H by means of pipe 15. An annular trough 24 is provided to collect a nonvaporized portion of the feed accumulating in chamber H. A pipe 12 is provided to convey the liquid collected in the trough 24 to chamber M, which is equipped with a similar trough 26 and pipe 3. A pipe 10 is provided to withdraw the non-vaporized portion of the feed from the low-pressure chamber L. Ring-shaped distributor conduits 17, 9 and 5 and circular baffle-plates 19, 13 and 7 are provided in the upper enlarged portions of chambers H, M and L, respectively, and cooperate in directing the flow of the liquid along the walls of each chamber. Conduits 29, 31 and 27 are provided to withdraw from the evaporator the condensate formed in chambers H, M and L, respectively.

In operation, the feed, after being preheated in heat-exchanger 23, is introduced into the chamber H by means of pipe 15 and annular distributor 17, and is caused by the action of the annular baffle plate 19 to flow without splashing in a thin uniform film down the cylindrical inner face of wall 18. Since his wall is heated from the outside by means of the jacket 21, a portion of the liquid flowing down this wall is vaporized, while another portion remains in a liquid state and accumulates in the ring-shaped trough 24, from which it is conveyed through pipe 12 to the middle chamber M, where it is again distributed over the inside face of wall 14 by means of the ring-shaped distributor 9 and baffle-plate 13, the process being further repeated for the central chamber L. Since, as explained above, chamber H is held at a higher pressure than chamber M, and the latter at a higher pressure than chamber L, the transfer of the unvaporized portions of the feed does not always require any special apparatus and may be accomplished by virtue of the existing pressure differentials. If desired, pipes 12 and 3 may be provided with external heating means for supplying additional heat to the liquid being conveyed from chamber H to chamber M, or from chamber M to chamber L.

The vapors formed from that portion of the feed which becomes vaporized in chamber H while flowing along the wall 18 condense on coming in contact with the outside face of wall 14, which is cooled by the liquid transferred through pipe 12 and flowing in chamber M, down the inside face of said wall. This liquid film flowing on wall 14 in chamber M is, in turn, vaporized by the latent heat liberated by the condensation process occurring in chamber H, said latent heat being sufficient to cause vaporization in chamber M due to the lower pressure prevailing in said chamber.

The same process is repeated in all the stages, the cooling of the wall 2 in the last stage L being effected by means of the cooling medium supplied through pipe 1. That portion of the feed which remains finally unvaporized after passing through all the stages is collected in trough 28 and withdrawn from the system by means of pipe 10.

The condensate formed in the several stages accumulates at their bottom, and after being withdrawn by means of pipes 27, 29 and 31, may be directed to storage or, if desired, recycled through the apparatus.

It is understood that the present apparatus is provided with any valves, pumps, and control devices necessary to regulate the flow of the various media and to maintain the several stages at the desired pressures and temperatures.

It is also understood that invention embodied in the evaporator described and illustrated above is in no way limited thereto, but is capable of any desired modifications and variations within the scope of the appended claims.

We claim as our invention:

1. In an apparatus for evaporating liquids, a plurality of annular pressure-tight concentric chambers formed by and divided from each other by a plurality of substantially vertical partitions, each of said chambers being of an enlarged diameter in its upper part, means for externally supplying heat to the outermost partition and withdrawing heat from the innermost partition, means for maintaining a step-wise pressure gradient in said series of chambers, the pressure being highest in the outermost chamber and lowest in the innermost chamber, means comprising an annular distributing conduit within the enlarged portion of the outermost chamber for introducing the liquid to be evaporated into said chamber, an annular baffle-plate located below said distributing conduit and cooperating therewith to vaporize the liquid by causing it to flow uniformly downwards as a film over the inside face of the outer partition of said chamber, an annular trough for collecting the liquid flowing down said wall, a pipe extending into said trough for conveying the collected liquid to the next inner chamber, distributing conduits, baffle plates, troughs and pipes arranged as above in each of the inner chambers to cause the liquid to flow uniformly downwards as a film over the inside face of each intermediate partion separating two adjacent chambers, the outside face of said intermediate partitions being thereby cooled to form a condensing surface for the vapors in contact therewith, the pipe extending into the trough of the innermost chamber being adapted to withdraw the liquid collecting in said trough from the system, and conduits connected to the lower portion of each chamber to withdraw the condensation products formed therein from the system.

2. In an apparatus for evaporating liquids, a plurality of annular pressure-tight concentric chambers formed by and divided from each other by a plurality of substantially vertical partitions, means for externally supplying heat to the outermost partition and withdrawing heat from the innermost partition, means for maintaining a step-wise pressure gradient in said series of chambers, the pressure being the highest in the outermost chamber and lowest in the innermost chamber, conduit means in communication with the upper portion of the outermost chamber for introducing the liquid to be evaporated into said chamber, annular flow-directing means cooperating therewith for causing the liquid to flow uniformly downwards as a film over the inside face of the outer partition of said chamber, whereby said liquid is vaporized, a collector for the liquid flowing down said wall, a conduit in communication with said collector for conveying the collected liquid to the next inner chamber, flow directing means, collectors and conduits arranged as above in each of the inner chambers to cause the liquid to flow uniformly downwards as a film over the inside face of each intermediate partition separating two adjacent chambers, the outside face of each partition being directly exposed to the inside face of the adjacent partition, whereby said intermediate partitions are cooled to form a condensing surface for the vapors in contact therewith, the conduit in communication with the collector of the innermost chamber being adapted to withdraw the liquid collecting therein from the system, and exhaust means in communication with the lower portion of each chamber to withdraw the condensation products formed therein from the system.

HEIN ISRAEL WATERMAN.
CORNELUS van VLODROP.